(12) United States Patent
Thompkins

(10) Patent No.: US 7,731,299 B2
(45) Date of Patent: Jun. 8, 2010

(54) SPARE TIRE ASSEMBLY

(76) Inventor: Torek Thompkins, 100 Pine Arbor Dr., Orlando, FL (US) 32825

( * ) Notice: Subject to any disclaimer, the term of this patent is extended or adjusted under 35 U.S.C. 154(b) by 0 days.

(21) Appl. No.: 12/149,139

(22) Filed: Apr. 28, 2008

(65) Prior Publication Data

US 2009/0267404 A1    Oct. 29, 2009

(51) Int. Cl.
 *B60B 11/10* (2006.01)
(52) U.S. Cl. .................. 301/38.1; 301/40.3
(58) Field of Classification Search ............ 301/38.1, 301/39.1, 40.1, 40.2, 40.3
See application file for complete search history.

(56) References Cited

U.S. PATENT DOCUMENTS

| | | |
|---|---|---|
| 936,866 A | 10/1909 | Delamere |
| 1,054,831 A | 3/1913 | De Peel |
| 1,057,388 A | 3/1913 | Bigsby |
| 1,077,030 A | 10/1913 | Bean |
| 1,080,653 A | 12/1913 | Pillsbury |
| 1,251,277 A | 12/1917 | Poe |
| 1,410,460 A | 3/1922 | Daniel |
| 1,501,399 A | 7/1924 | Hannan et al. |
| 1,504,649 A * | 8/1924 | Smith, Jr. .............. 301/39.1 |
| 1,683,306 A | 9/1928 | Ryan et al. |
| 1,721,006 A | 7/1929 | Delaney |
| 1,791,293 A | 2/1931 | Steinberg |
| 1,808,979 A | 6/1931 | Fitz |
| 2,369,202 A | 2/1945 | Ash |
| 2,566,007 A * | 8/1951 | Weaver .............. 301/38.1 |
| 2,823,956 A * | 2/1958 | Gray .................. 301/38.1 |
| 2,951,524 A | 9/1960 | Darling et al. |
| 2,979,359 A | 4/1961 | Tripp |
| 3,116,094 A | 12/1963 | Glasgow |
| 3,132,823 A | 5/1964 | Domines |
| 3,252,672 A | 5/1966 | Scott |
| 3,278,159 A | 10/1966 | Jack |
| 3,567,287 A * | 3/1971 | Nutter ............... 301/38.1 |
| 3,653,718 A | 4/1972 | Gellender |
| 3,664,709 A * | 5/1972 | Barr'e ................ 301/36.1 |
| 3,770,323 A * | 11/1973 | Isaacson ............. 301/38.1 |
| 3,784,163 A | 1/1974 | Swanson et al. |
| 3,866,978 A | 2/1975 | Fine |
| 3,934,936 A | 1/1976 | Fine |

(Continued)

FOREIGN PATENT DOCUMENTS

JP    2189208    7/1990

*Primary Examiner*—S. Joseph Morano
*Assistant Examiner*—Kip T Kotter
(74) *Attorney, Agent, or Firm*—Kramer & Amado, P.C.

(57) ABSTRACT

A wheel on a vehicle having a flat tire may be protected by attaching a first semi-cylindrical shell having a first planar end to the wheel, and attaching a second semi-cylindrical shell to the first semi-cylindrical shell. The first semi-cylindrical shell and the second semi-cylindrical shell are secured together so as to form a cylindrical shell of diameter having a cylindrical wall which covers a tread surface of the flat tire. The first semi-cylindrical shell is attached to the wheel to cover a first portion of a tread surface of the flat tire; and, after attaching the first semi-cylindrical shell, the wheel is rotated. The first portion of the tread surface does not contact a ground surface prior to the rotation step, but does contact a ground surface through the first semi-cylindrical shell after the rotation step. A connector for connecting the semi-cylindrical shells to the wheel is also disclosed.

13 Claims, 9 Drawing Sheets

U.S. PATENT DOCUMENTS

| | | |
|---|---|---|
| 4,135,681 A | 1/1979 | Cooper |
| 4,165,904 A | 8/1979 | Reppert |
| 4,240,486 A | 12/1980 | Schmit et al. |
| 4,291,847 A | 9/1981 | Gilbert |
| 4,568,036 A | 2/1986 | Kearney |
| 4,666,216 A * | 5/1987 | Smith ................ 301/40.4 |
| 4,778,126 A | 10/1988 | Spann, Jr. |
| 4,836,466 A | 6/1989 | Peterson |
| 4,929,032 A * | 5/1990 | Isaacson ................ 301/38.1 |
| 5,301,527 A | 4/1994 | Pollard |
| 5,407,255 A * | 4/1995 | Feldman ................ 301/38.1 |
| 5,551,762 A | 9/1996 | Roopngam |
| 6,068,346 A * | 5/2000 | Pender ................ 301/40.6 |
| 6,217,125 B1 * | 4/2001 | Tubetto ................ 301/40.3 |
| 6,877,819 B1 * | 4/2005 | Kwak ................ 301/38.1 |
| 7,007,928 B2 | 3/2006 | Van Cor |
| 2004/0084663 A1 | 5/2004 | Van Cor |

* cited by examiner

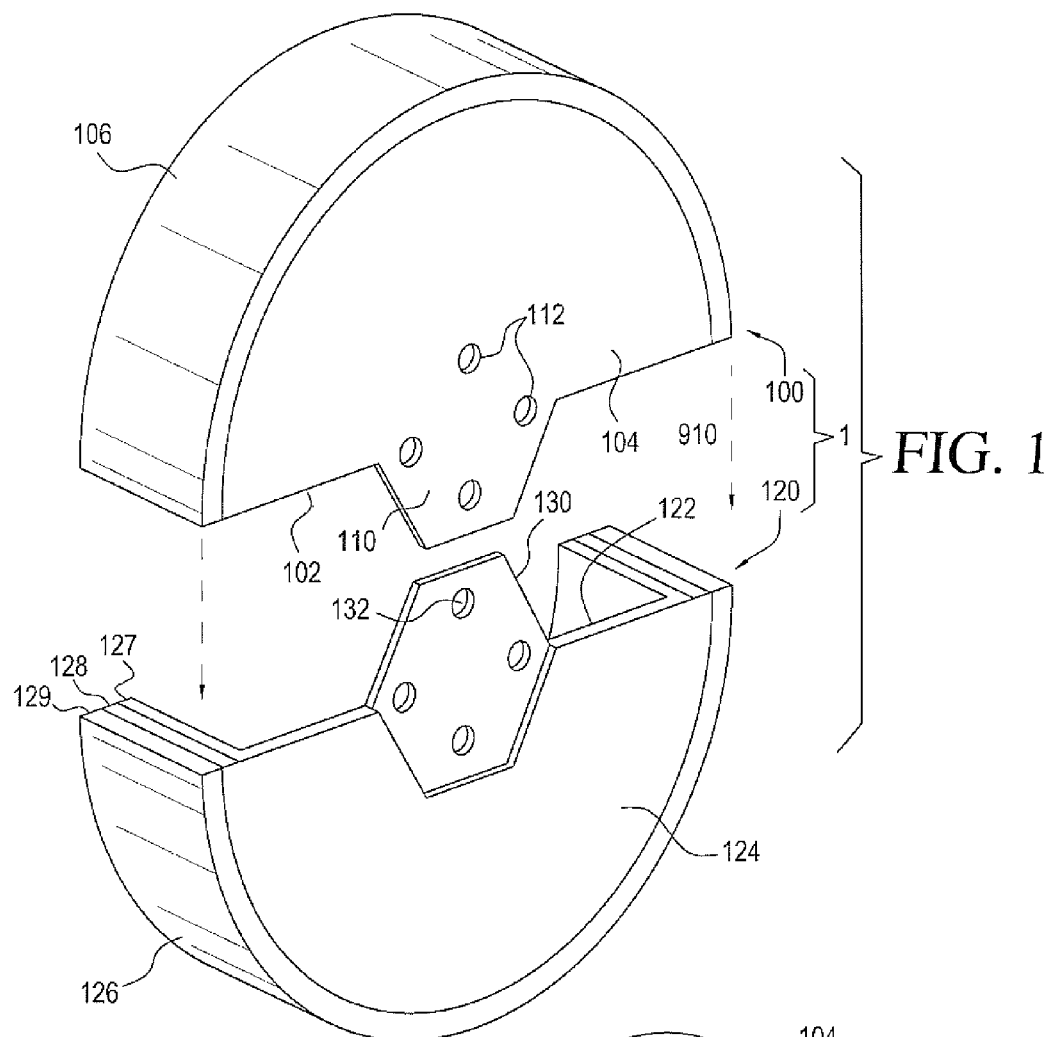
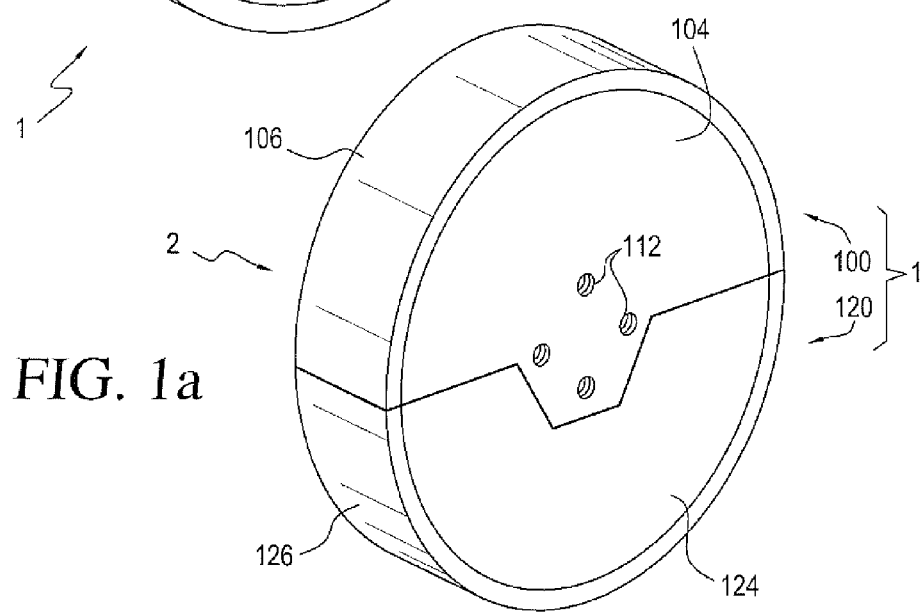

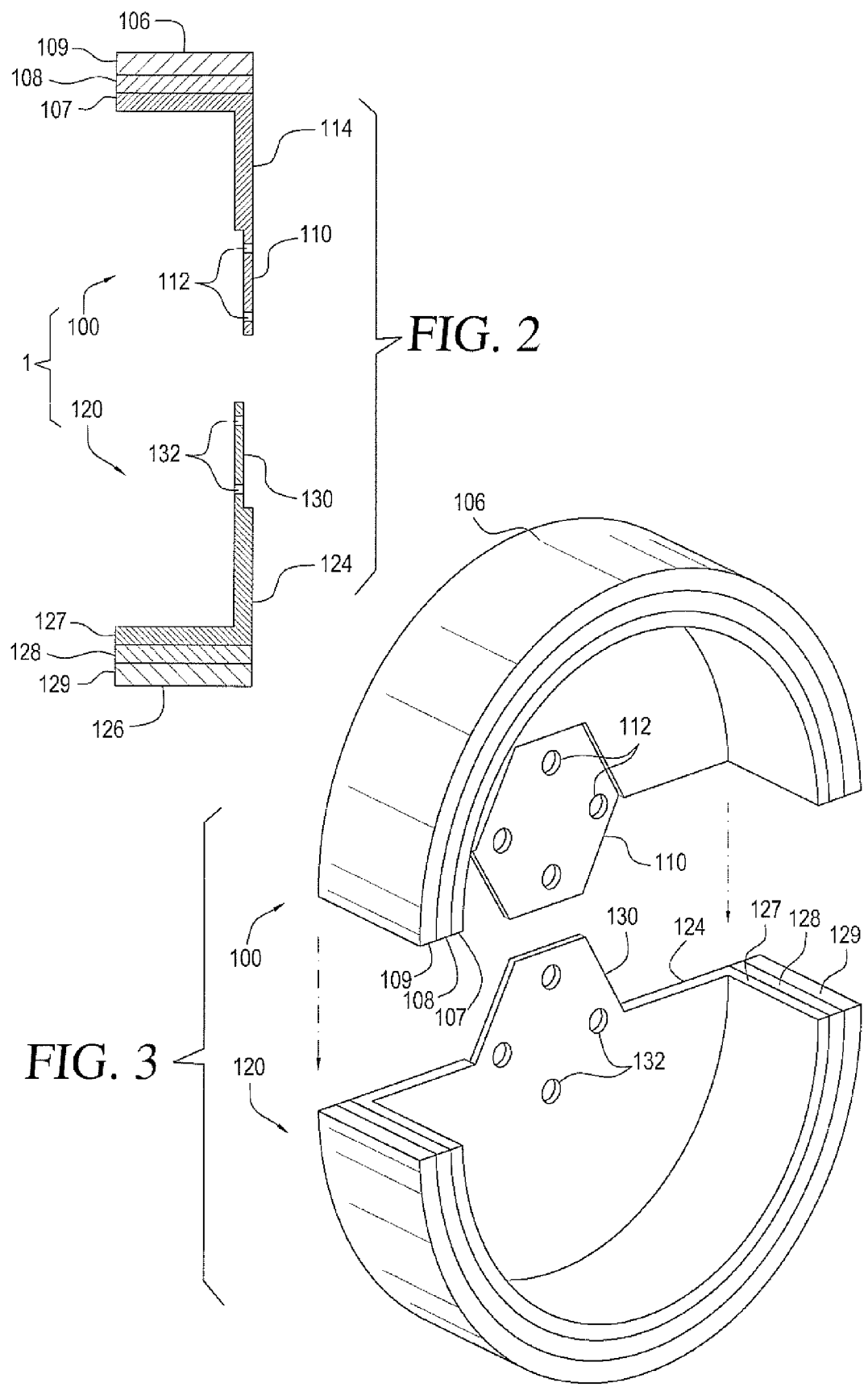

SPARE TIRE ASSEMBLY

BACKGROUND OF THE INVENTION

1. Field of the Invention

The invention relates generally to the field of spare tires, and more particularly to spare tires that can be used to protect the wheel or wheel rim of a vehicle without requiring removal of the flat tire from the vehicle.

2. Description of Related Art

One of the most common maintenance procedures that a driver must perform is changing a flat tire. To change a flat, a driver must typically execute the following steps remove the lug nuts securing the wheel carrying the flat tire to the vehicle; remove the wheel from the vehicle; position a spare wheel bearing a flat tire on the vehicle; and secure the spare wheel to the vehicle by replacing the lug nuts.

Various attempts have been made to provide a substitute for the traditional spare tire. A wide variety of modular spare tires comprised of a plurality of connecting segments have been proposed. In most cases, however, the original flat tire must still be removed from the vehicle, requiring a hazardous step of jacking up the vehicle. In other cases, the original flat tire is not replaced, but is supplemented by a spare tire system which rides alongside the outer surface of the tire, greatly increasing tire width. Additionally, some cars have wheel wells which may not be deep enough to allow for such excess tire width.

There remains a need for a lightweight spare tire that can be mounted on a vehicle without a need for changing the flat. Preferably, a typical driver should be able to install the lightweight spare tire with a minimum of tools and effort.

SUMMARY OF THE INVENTION

Various embodiments of the current invention offer a method of installing a spare tire without requiring complicated tools or jacks. Various exemplary embodiments of the invention offer tools which may be used in place of standard lug nuts or lug bolts to facilitate installation of a spare tire without requiring tire replacement. In various exemplary embodiments, a system or kit for facilitating rapid installation of a spare tire is provided.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

In light of the present need for improved systems or methods for installation of a spare tire, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

In various exemplary embodiments, the current invention relates to a system for attachment to a vehicle wheel, the wheel having a flat tire of diameter d attached thereto. The system includes a first semi-cylindrical shell having a first planar end; a second semi-cylindrical shell; at least one tool or connector for connecting the first planar end to the wheel; and an attachment member for securing the first semi-cylindrical shell to the second semi-cylindrical shell. The first semi-cylindrical shell and the second semi-cylindrical shell are secured together so as to form a cylindrical shell having a cylindrical wall of diameter greater than d which covers a tread surface of the wheel.

In certain embodiments, the first and second semi-cylindrical walls each have an outer layer with a tread surface attached thereto. The first semi-cylindrical shell and the second semi-cylindrical shell may be made of a rigid material, such as metal or fiber-reinforced plastic. In each semi-cylindrical shell, the outer layer with a tread surface is made of an elastomer In various exemplary embodiments, a tool or connector is used to connect the first semi-cylindrical shell to the wheel. The connector comprises a lug nut or lug bolt, the lug nut or lug bolt having a wide first end with a first threaded joint, and a narrow second end with a second joint. A cap having a head and a joint which releasably connects to the second joint may be secured to the narrow second end of the lug nut or lug bolt.

The spare tire assembly as described herein protects a wheel of a vehicle from damage from friction arising from direct contact between the rim of the wheel and an interior surface of a flat tire. Also, if the contact between the wheel and the interior surface of a flat tire causes the tire to split or rupture, the wheel is subject to damage from direct contact between the rim of the wheel and a road surface. The spare tire assembly as described herein prevents such contact, thereby protecting the wheel.

In various exemplary embodiments, a method for protecting a wheel on a vehicle, the wheel having a flat tire of diameter d attached thereto, is disclosed. The method comprises a step of attaching a first semi-cylindrical shell having a first planar end to the wheel; and a step of attaching a second semi-cylindrical shell to the first semi-cylindrical shell. The first semi-cylindrical shell and the second semi-cylindrical shell are secured together so as to form a cylindrical shell of diameter greater than d having a cylindrical wall which covers a tread surface of the flat tire. In various exemplary embodiments, the first semi-cylindrical shell is attached to the wheel so as to cover a first portion of a tread surface of the flat tire. The first portion of the tread surface does not contact a ground surface when the first semi-cylindrical shell is first installed. The wheel is then rotated, either manually or by driving the vehicle a sufficient distance to rotate the wheel until the first portion of the tread surface contacts a ground surface through the first semi-cylindrical shell. The second semi-cylindrical shell is then attached to the first semi-cylindrical shell so as to cover the remaining portion of the tread surface of the flat tire.

BRIEF DESCRIPTION OF THE DRAWINGS

In order to better understand various exemplary embodiments, reference is made to the accompanying drawings, wherein:

FIG. 1 shows an elevational view of the two portions of a first embodiment of a spare tire described herein;

FIG. 1a shows an elevational view of a spare tire assembly assembled from two portions, as described herein;

FIG. 2 shows a cross sectional view of the two portions of a first embodiment of a spare tire described herein;

FIG. 3 shows a second elevational view of the two portions of a first embodiment of a spare tire described herein;

DETAILED DESCRIPTION OF THE PREFERRED EMBODIMENTS OF THE INVENTION

Figure 4:
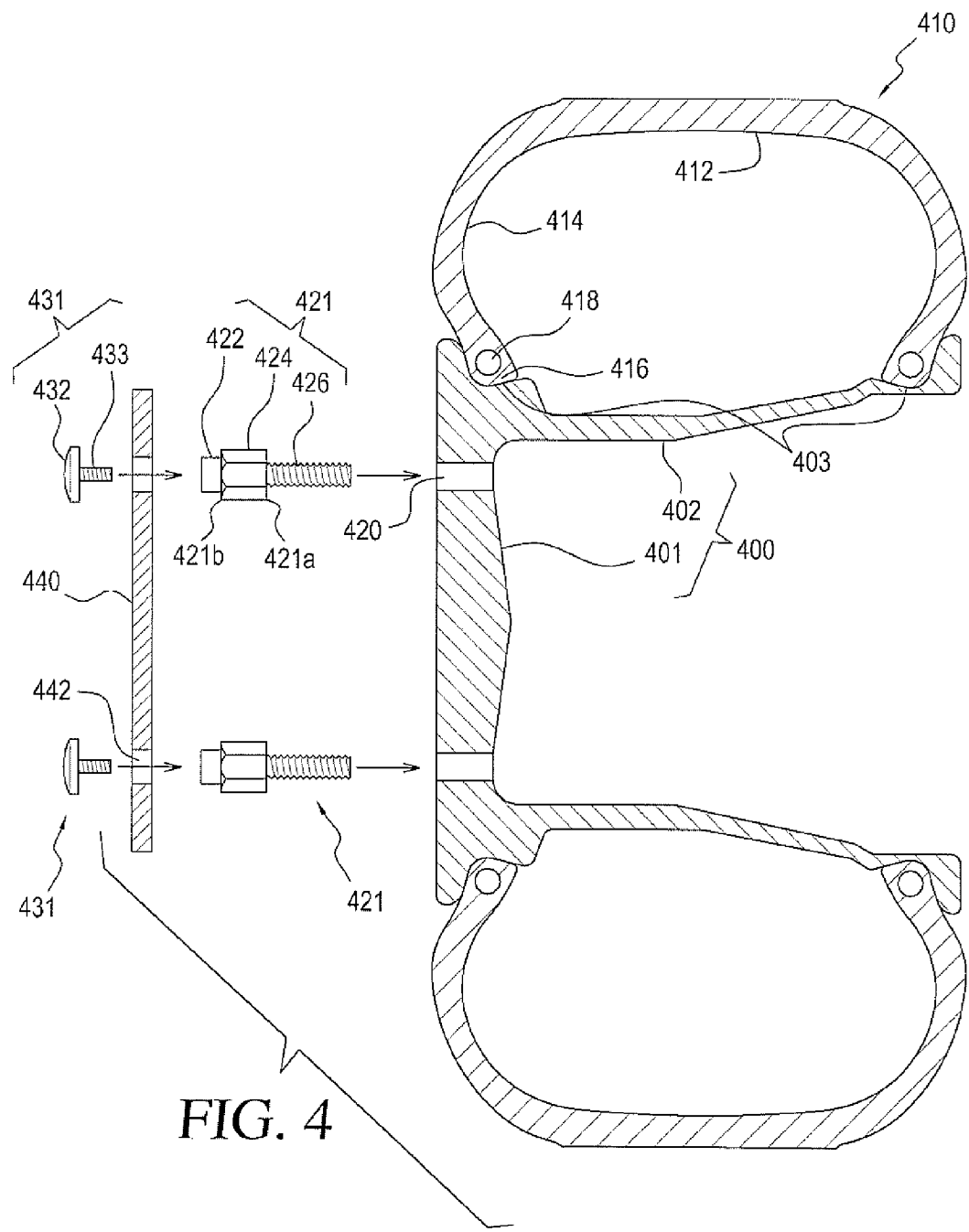
FIG. 4 shows lug adaptors for use with a spare tire described herein, in combination with a wheel and tire assembly.

Referring now to the drawings, in which like numerals refer to like components or steps, there are disclosed broad aspects of various exemplary embodiments. FIG. 1 is a perspective view showing two halves, 100 and 120, of an exemplary embodiment of a spare tire assembly 1 according to the present disclosure. Referring first to tire half 120, tire half 120 includes a semi-cylindrical shell 122 having a first planar end surface 124 and a curved outer wall 126. Outer wall 126 is made of a laminated material having a rigid inner shell 127, an outer tread layer 129, and an optional intermediate cushioning layer 128. End surface 124 is secured to inner shell 127. End surface 124 and inner shell 127 may be integrally formed by molding them as a single unit, thermoforming them from sheet material, or stamping them from sheet metal. They are preferably formed from a metal such as steel, aluminum, titanium or alloys thereof, or from a thermoplastic or thermosetting polymer material. The polymeric materials may be reinforced with carbon, metal, or ceramic fibers. End surface 124 and inner shell 127 may also be joined together by an adhesive material or by welding.

The outer tread layer 129 is preferably formed from a polyurethane or a vulcanized or thermoset rubber material suitable for forming tire treads. Such a rubber material of the present invention can be obtained from a polyurethane elastomer; a diene rubber, such as natural rubber, polyisoprene, poly(1,3-butadiene), polychloroprene, poly(isobutylene); or an elastomeric block copolymer such as styrene-butadiene rubber (SBR) or ethylene-propylene-diene monomer rubber (EPDM). A polyurethane elastomer or diene rubber having a glass transition temperature (Tg) of at most −30° C. is preferable from the viewpoint of properties at low temperature. These tread-forming polymers can be used singly or in a combination of two or more polymers.

The tread material may contain reinforcing materials such as inorganic fillers and fibers. The fillers may include carbon black or ceramic oxides such as silica, alumina, or titanium dioxide. The fibers may include carbon, glass, ceramic, or metal fibers or whiskers. The fibers and whiskers are used to increase the toughness and/or abrasion resistance of the tread material. Silicone rubber powders may also be added to the tread material to inhibit the rubber hardness from increasing with the passage of time.

The intermediate layer 128 serves to cushion the tread layer, and reduces mechanical wear on the tread layer by inner layer 127. Intermediate layer 128 may be made of rubber or a polyurethane elastomer or foam, and is preferably compounded to enhance the adhesion between the tread layer and the rigid inner layer 127. Layer 128 also helps reduce slippage between layers 127 and 129, reducing the likelihood of tread layer delamination.

In tire half 120, there is a central portion 130 of planar end surface 124 which is designed to cover a wheel of an automobile, as discussed below. Central portion 130 has a plurality of holes 132, which are designed to receive specially designed connectors 421, shown in more detail in FIG. 5. The connectors 421 are designed to hold tire portion 120 on the wheel. The connectors 421 may be lug nut or lug bolt adaptors. The outer surface of central portion 130 is depressed relative to the remainder of the outer surface of planar end surface 124.

The construction of tire half 100 is substantially similar to the construction of tire half 120. Tire half 100 includes a second semi-cylindrical shell 102 having a first planar end surface 104 and a curved outer wall 106. Outer wall 106 is made of a laminated material having a rigid inner shell 107, an outer tread layer 109, and an optional intermediate cushioning layer 108 (See FIG. 2). End surface 104 and inner shell 107 may be integrally formed, or may be joined together by an adhesive material or by welding, in the same manner as end surface 124 and inner shell 127 of tire portion 120.

The outer tread layer 109 is preferably formed from a polyurethane or a vulcanized or thermoset rubber material suitable for forming tire treads. The intermediate layer 108 serves to cushion the tread layer, and reduces mechanical wear on the tread layer by inner layer 107. Intermediate layer 108 may be made of rubber or a polyurethane elastomer or foam.

Figure 5:
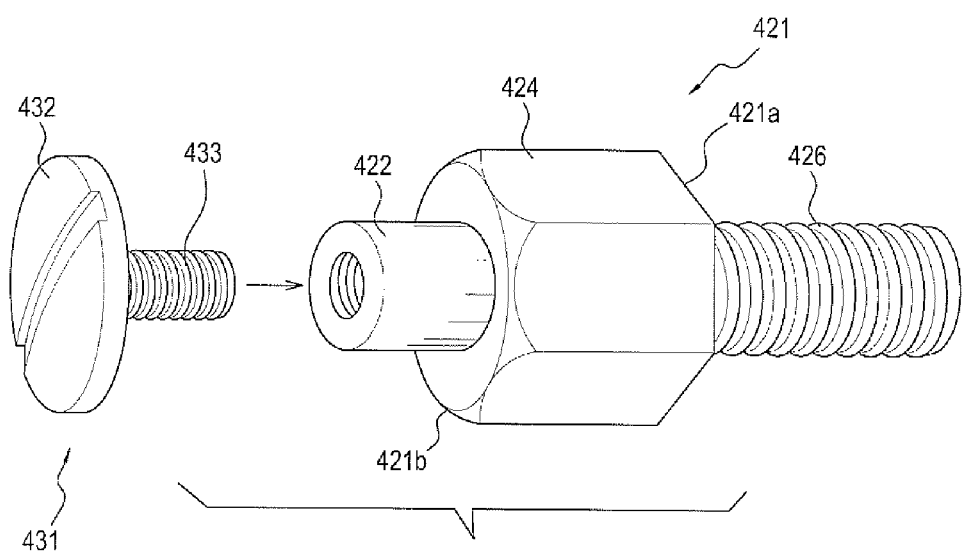
FIG. 5 shows a first embodiment of the lug adaptors.

In tire half 100, there is a central portion 110 of planar end surface 104. As seen in FIG. 2, the inner surface of central portion 110 is depressed relative to the remainder of the inner surface of planar end surface 104. Central portion 110 has a plurality of holes 112, which have the same size and shape as holes 132 on central portion 130 of planar end surface 124. As seen in FIG. 2, the central portions 110 and 130 of tire halves 100 and 120 fit together. More particularly, as seen in FIG. 1a, the central portions 110 and 130 of tire halves 100 and 120 fit together to form a cylinder 2 which is closed at one end by an end wall formed from planar end surfaces 104 and 124, and an outer wall formed from curved outer walls 106 and 126. The open end of the hollow cylinder 2 has a size which is suitable to receive a tire. The depressed central portion 110 of planar end surface 104 overlies the depressed central portion 130 of planar end surface 124, in such a manner that the positions of holes 112 coincide exactly with holes 132, forming a plurality of openings through the end wall formed from planar end surfaces 104 and 124. These openings are designed to receive specially designed connectors 421, which are shown in FIG. 5 and may be lug nut or lug bolt adaptors. The combined thickness of the depressed central portion 110 of planar end surface 104 and the depressed central portion 130 of planar end surface 124 is t.

The connectors 421 will now be discussed with reference to FIG. 4. FIG. 4 shows a tire 410 mounted on a wheel 400. The wheel has a disc 401 and a rim 402; each rim has two bead receiving grooves 403. Tire 410 includes a tread portion 412 and two sidewall portions 414. Each sidewall has a bead 416 which fits into one of bead receiving grooves 403; each bead includes a bead wire embedded therein. The disc 401 has a plurality of bolt-receiving holes 420.

Connectors 421, as illustrated in FIG. 4, take the form of lug adaptors, and include a head portion 422 having a female joint; a body portion 424 having a hexagonal cross section; and a threaded male joint 426 adapted to pass through a joint 420 into a threaded female joint on a brake drum. Each connector has a wide first end 421a with a first threaded joint 426 which screws onto a threaded joint on said wheel, and a narrow second end 421b with a female joint 422. Head portion 422 is narrower than body portion 424. Male joint 426 screws into the threaded female joint on a brake drum. Body portion 424 is shaped so as to fit into the socket of a lug wrench; the lug wrench may be used to tighten lug adaptor 421.

As an alternative, lug adaptor 421 may contain a threaded female joint instead of a threaded male joint 426. In such a case, a threaded male joint on a brake drum passes through a bolt-receiving hole 420; and the threaded female joint on lug adaptor 421 screws onto the threaded male joint on the brake drum.

Lug adaptors 421 are used in conjunction with a cap 431. Cap 431 includes a head portion 432, and a male joint 433 which fits into the female joint in head portion 422 of lug adaptor 421. As shown in FIG. 5, the male joint 433 may be a threaded male joint, which screws into a threaded female joint in head portion 422 of lug adaptor 421. Head portion 432 may be a flat disc-shaped head portion having a slot therein. Cap 431 may then be screwed into place in the threaded female joint in head portion 422 by using a flat-bladed screwdriver. Alternatively, cap 431 may be a bolt which includes a hexagonal head portion 432, and a threaded male joint 433 which fits into the threaded female joint in head portion 422 of lug adaptor 421. Hexagonal head portion 432 is preferably sized so as to allow cap 431 to be screwed into place in the threaded female joint in head portion 422 by using a lug wrench.

Lug adaptors 421 are used to replace standard lug nuts or lug bolts on an automobile. The lug adaptors 421 may be stored until needed (i.e., until a tire goes flat); or the lug adaptors 421 may be used as replacements for standard lug nuts or lug bolts under normal circumstances. If a driver uses lug adaptors 421 in place of standard lug nuts or lug bolts when driving the car, an optional wheel cover 440 may be used, as shown in FIG. 4. Wheel cover 440 is a round or slightly bowl-shaped disc or plate having a plurality of holes 442 therethrough. Holes 442 have an inner diameter which is larger than the outer diameter of head portion 422 of lug adaptor 421, but less than the outer diameter of head portion 432 of cap 431 and the outer diameter of body portion 424 of lug adaptor 421. The positions of holes 442 coincide with the positions of holes 420 in wheel disc 401, allowing the holes 442 in wheel cover to be placed over the head portions 422 of lug adaptors 421. Caps 431 are then secured in position, holding wheel cover 440 over wheel disc 401.

Figure 6:
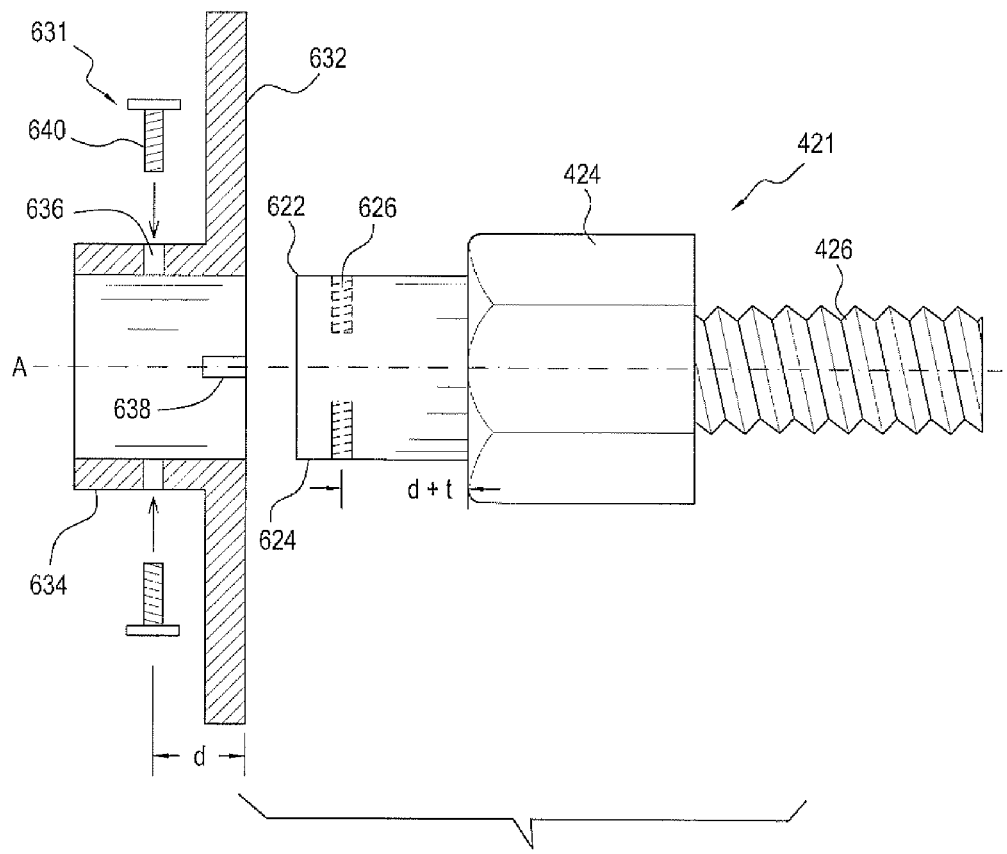
FIG. 6 shows a second embodiment of the lug adaptors.

In various exemplary embodiments, lug adaptors 421 may be designed as illustrated in FIG. 6. The lug adaptors 421 of FIG. 6 include a head portion 622 having a male joint 624 having an axis A with at least one, and preferably two or three, threaded female joints 626 positioned in joint 624 normal to axis A; a body portion 424 having a hexagonal cross section; and either a threaded male joint 426 adapted to pass through a hole 420 into a threaded female joint on a brake drum, or a threaded female joint adapted to receive, through a hole 420, a threaded male joint extending from a brake drum.

Lug adaptors 421 of FIG. 6 are used in conjunction with a cap 631. Cap 631 includes a planar disc 632 and a tubular joint 634 which slides over male joint 624 in head portion 622. Two holes 636 pass through the wall of tubular joint 634, and a tab 638 is positioned on the inner surface of tubular joint 634. As shown in FIG. 6, the tubular joint 634 slides over the male joint 624 in head portion 622 of lug adaptor 421; tab 638 engages a slot running along the length of male joint 624 (not shown in FIG. 6), thereby preventing relative rotation between joints 624 and 634. When holes 636 coincide with female joints 626, cap 631 is secured in position by passing bolts 640 through holes 636 into female joints 626, and screwing them into position with an allen wrench. The distance between the inner edge of disc 632 and the center of hole 636 is d; the distance between the outer edge of body portion 424 and the center of female joint 626 is d+t. If a wheel cover is used, the wheel cover has a thickness t. In various exemplary embodiments of the tire assembly, the combined thickness of the depressed central portion 110 of planar end surface 104 and the depressed central portion 130 of planar end surface 124 is t. Thus, the lug adaptor of FIG. 6 is able to hold either the wheel cover 440 or the tire assembly in place securely.

Figure 7:
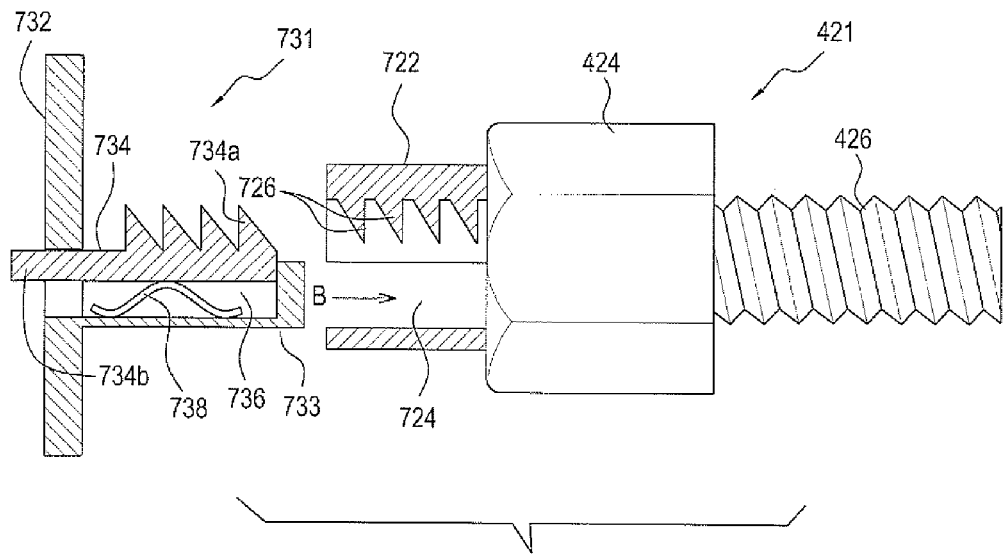
FIG. 7 shows a third embodiment of the lug adaptors.

In various exemplary embodiments, lug adaptors 421 may be designed as illustrated in FIG. 7. The lug adaptors 421 of FIG. 7 include a head portion 722 having a female joint 724 having teeth 726 positioned in joint 724; a body portion 424 having a hexagonal cross section; and either a threaded male joint 426 adapted to pass through a hole 420 into a threaded female joint on a brake drum, or a threaded female joint adapted to receive, through a hole 420, a threaded male joint extending from a brake drum.

Lug adaptors 421 of FIG. 7 are used in conjunction with a cap 731. Cap 731 includes a head portion 732, and a male joint 733 which fits into the female joint in head portion 722 of lug adaptor 421. As shown in FIG. 7, the male joint 733 slides into the toothed female joint 724 in head portion 722 of lug adaptor 421. A toothed element 734 having teeth 734a is positioned in slot 736, where slot 736 runs through head portion 732, and longitudinally along the length of male joint 733. Element 734 reversibly moves in the direction of Arrow C between a first position where teeth 734a are exposed, and a second position where teeth 734a are concealed within slot 736. Normally, element 734 is biased into the first position, although it may be moved into the second position by downward pressure on knob 734b. As shown in FIG. 7, element 734 may be biased into the first position by a leaf spring 738. Cap 731 may be fitted to lug adaptors 421 by sliding the male joint 733 in the direction of arrow B into the female joint 724 in head portion 722 of lug adaptor 421. As the slanted side of teeth 734a engage the slanted side of the teeth 726 in female joint 724, toothed element 734 is depressed and enters the second position. Once the cap 731 has been placed in position, the surfaces of teeth 734a and teeth 726 which engage are normal to the direction of sliding motion of cap 731. Unless knob 734b is depressed, cap 731 and female joint 724 will not move relative to each other. Depression of knob 734b moves toothed element 734 into the second position where teeth 734a are concealed, thereby allowing removal of cap 731.

Figure 8:
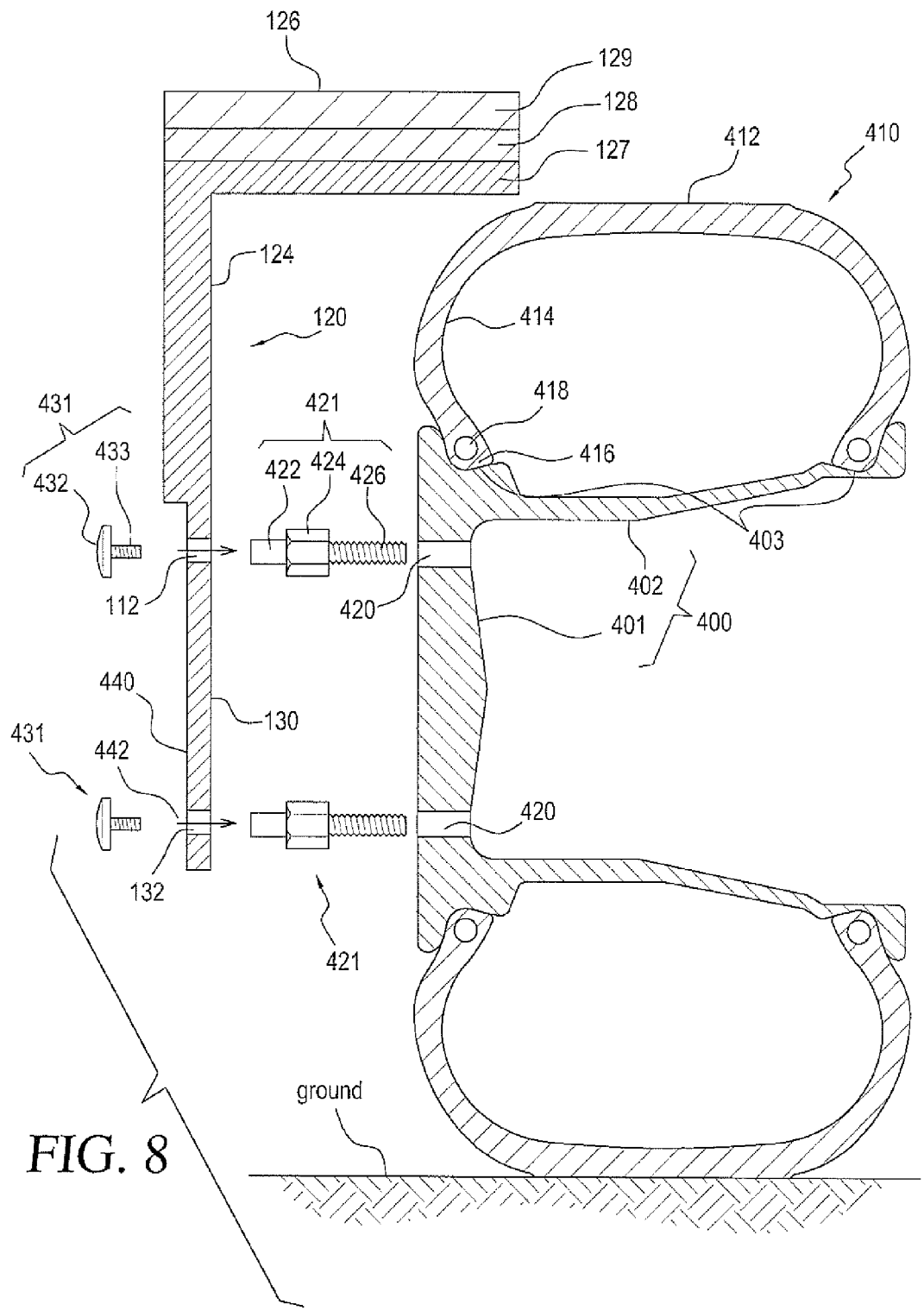
FIG. 8 shows the method of attaching a first portion of a first embodiment of a spare tire as described herein to a wheel and tire assembly.
Figure 9:
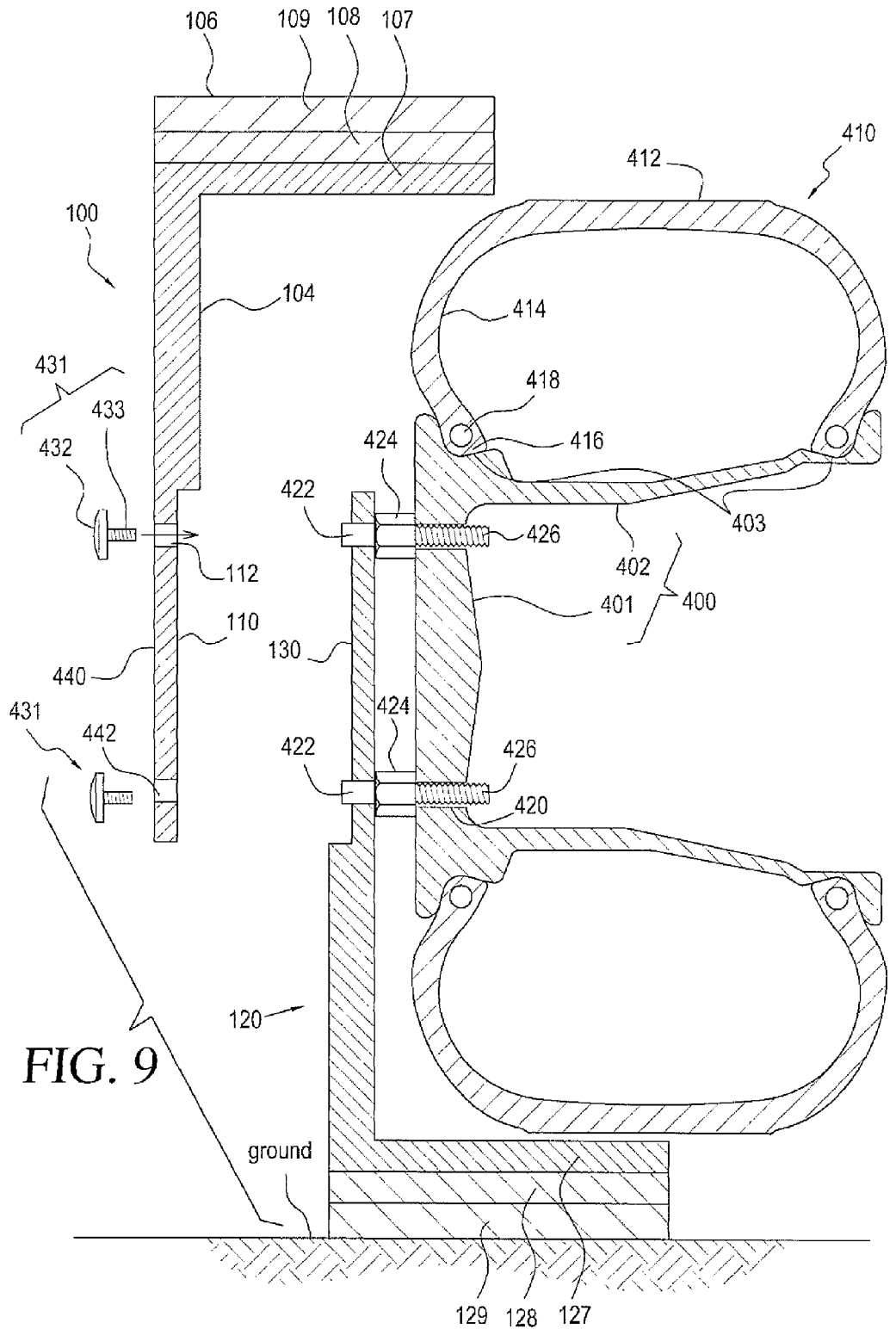
FIG. 9 shows the method of attaching a second portion of a first embodiment of a spare tire as described herein to a wheel and tire assembly.

The method of placing the segmented spare tire on a wheel having a flat tire will now be described, with reference to FIG. 8. In a first step, tire half 120 is positioned over a tire so that the curved outer wall is positioned over, and supported by, about 50% of the tread surface 412 of the flat tire, opposite that portion of tread surface 412 which is supported by the ground. The central portion 130 of planar end surface 124 of tire half 120 is positioned over the wheel 400 of the vehicle. Central portion 130 has a plurality of holes 132. If lug bolts are used to attach the tire to the wheel, then holes 132 are positioned in alignment with holes 420 in the wheel and threaded bolt-receiving holes in the outer surface of the brake drum of the vehicle (not shown in FIG. 8). Lug adaptors 421 having body portion 424 and a threaded male joint 426 pass through holes 132 in the central portion 130 of tire portion 120 and through holes 420 in the wheel of the vehicle, and are screwed into the threaded female joints on the brake drum.

The tire portion 120 is secured into position by then fitting caps 431 onto lug adaptors 421, and securing the caps 431 into position.

Alternatively, if lug nuts are used to attach the tire to the wheel, tire half 100 is positioned over a tire, and the central portion 130 of planar end surface 124 of tire half 120 is positioned over the wheel of the vehicle. Then holes 132 are positioned over threaded male joints extending from the brake drum of the vehicle through holes 420 in the wheel of the vehicle. Lug adaptors 421 having body portion 424 and a threaded female joint are screwed onto the threaded male joints extending from the brake drum. The tire half 120 is secured into position by then fitting caps 431 onto lug adaptors 421, and securing the caps into position.

After the tire half 120 is positioned on the wheel of the vehicle, the wheel is rotated by about 180°. This may be done by jacking up the wheel and manually rotating it; by pushing the car a sufficient distance to rotate the wheel by 180°, or by driving the car a sufficient distance to rotate the wheel by ((180°+n(360°)), where n is 0 or a positive integer. At this point, the tread of the flat tire is positioned on the inner surface of the curved outer wall of tire half 120, and tire half 120 is supported on the ground. The caps 431 are then removed from lug adaptors 421, and tire half 100 is positioned over the heads 422 of lug adaptors 421 so that the tire half 100 covers the remaining portion of tread surface 800 of the flat tire. The caps 431 are then replaced in lug adaptors 421, securing tire halves 100 and 120 together. Caps 431 additionally secure tire halves 100 and 120 to the wheel of the vehicle so as to cover the tread surface 800 of the flat tire.

Figure 10:
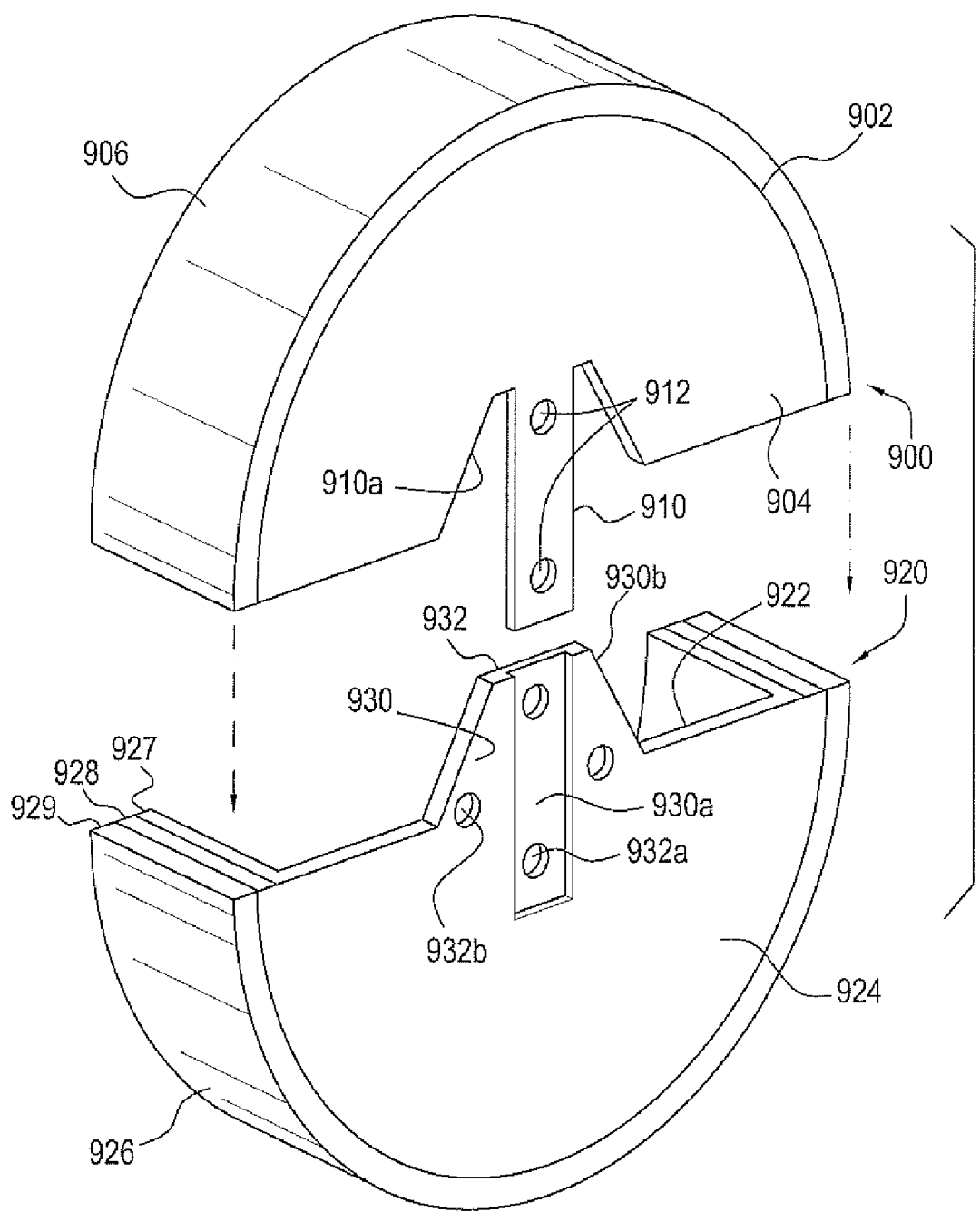
FIG. 10 shows an elevational view of the two portions of a second embodiment of a spare tire described herein.

FIG. 10 is a perspective view showing two halves, 900 and 920, of an alternate embodiment of a spare tire assembly according to the present disclosure. Referring first to tire half 920, tire half 920 includes a semi-cylindrical shell 922 having a first planar end surface 924 and a curved outer wall 926. End surface 924 is secured to outer wall 926. In tire half 920, there is a central portion 930 of planar end surface 924 which is designed to cover a wheel of a vehicle, as discussed below. Central portion 930 has a plurality of holes 932a and 932b, which are designed to receive specially designed lug nut or lug bolt adaptors designed to hold tire half 920 on the wheel. A portion 980a of the outer surface of central portion 930 is depressed relative to the remainder of the outer surface of planar end surface 924; holes 932a pass through depressed portion 930a. A portion 930b of the outer surface of central portion 930 is not depressed relative to the remainder of the outer surface of planar end surface 924; holes 932b pass through non-depressed portion 930b.

Tire half 900 includes a semi-cylindrical shell 902 having a first planar end surface 904 and a curved outer wall 906. In tire half 900, there is a central portion 910 of planar end surface 904. Central portion 910 has a plurality of holes 912, which are designed to receive specially designed lug nut or lug bolt adaptors designed to hold tire half 900 on the wheel. The inner surface of central portion 910 is depressed relative to the remainder of the inner surface of planar end surface 904; holes 912 pass through central portion 910. There are also cut-out portions 910a in central portion 910.

Figure 11:
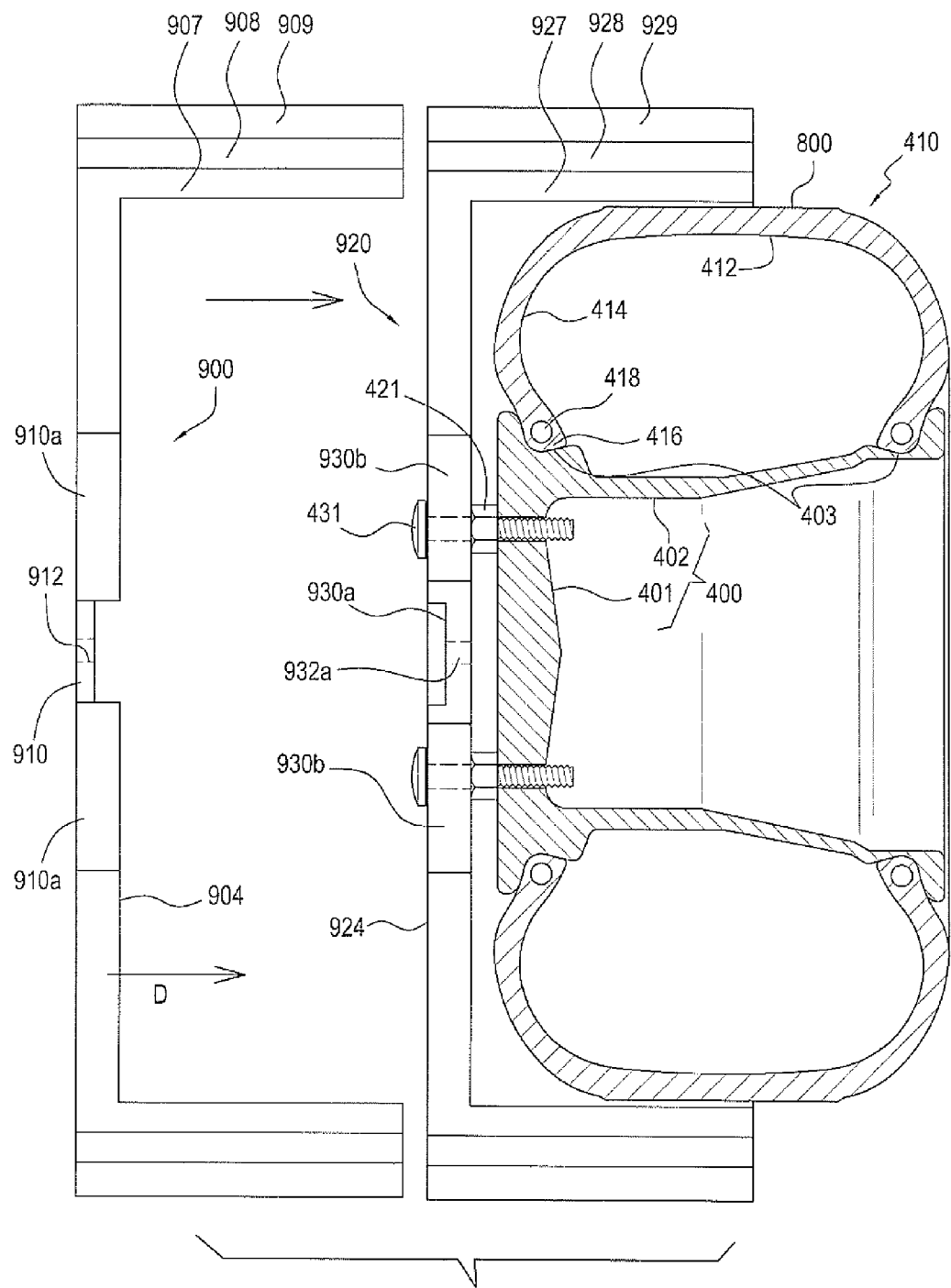
FIG. 11 shows the method of attaching the two portions of the second embodiment of a spare tire as described herein to a wheel and tire assembly.

Tire halves 900 and 920 are positioned over a tire in substantially the same manner that tire halves 100 and 120 are positioned over a tire, as shown in FIG. 11. The curved outer wall of tire half 920 is positioned over the flat tire. The central portion 910 of planar end surface 904 of tire half 900 is positioned over the wheel of the vehicle, with holes 912 positioned in alignment with holes 420 in the wheel and threaded joints in the outer surface of the brake drum of the vehicle. Lug adaptors 421 pass through holes 912 in the central portion 930a and 930b of tire half 920 and through holes 420 in the wheel of the vehicle, and screw onto matching threaded joints on the brake drum. The tire half 920 is secured into position by then fitting caps 431 onto lug adaptors 421, and securing the caps into position.

After the tire half 920 is positioned on the wheel of the vehicle, the wheel is rotated by about 180°. The caps 431 are then removed from those lug adaptors 421 passing through holes 932a in the depressed portion 930, and tire half 900 (seen in cross section in FIG. 11) is positioned over those lug adaptors 421 passing through holes 932a so that the tire half 900 covers the remaining portion of tread surface 800 of the flat tire (See Arrows D in FIG. 11). The caps 431 in lug adaptors 421 passing through holes 930b are not removed, so tire half 920 remains secured to the wheel. Central portion 910 of planar end surface 924 is positioned over the wheel of the vehicle, as discussed below. Cut-out portions 910a align with the non-depressed portions 930b of the central portion of tire half 920. The depressed inner portion of central portion 910 aligns with the depressed portions 930a of the central portion of tire half 920. Caps 431 are then repositioned in the lug adaptors 421 passing through holes 932a to lock tire half 900 into position so as to cover the remaining tread surface 800 of the flat tire (See Arrows E in FIG. 11).

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A system for attachment to a vehicle wheel having a flat tire attached thereto, said system comprising:
   a first semi-cylindrical shell having a first planar end surface;
   a second semi-cylindrical shell having a second planar end surface;
   at least one connector for connecting said first planar end surface to said wheel; and
   wherein said at least one connector comprises a plurality of lug adaptors, each lug adaptor having a body portion with a first threaded joint which screws onto a threaded joint on said wheel, and a head portion having a female joint;
   a means for securing said first planar end surface of said first semi-cylindrical shell to said second planar end surface of said second semi-cylindrical shell;
   wherein said means releasably connects to said female joint;
   wherein said first semi-cylindrical shell and said second semi-cylindrical shell are secured together so as to form a cylindrical shell having a cylindrical wall which covers a first tread surface of said flat tire.

2. The system of claim 1, wherein said first semi-cylindrical shell has said first planar end surface and a first semi-cylindrical wall attached to said first planar end surface; and
   wherein said second semi-cylindrical shell has a second semi-cylindrical wall;
   said first and second semi-cylindrical walls each having an outer layer with a second tread surface attached thereto.

3. The system of claim 2, wherein said first semi-cylindrical shell and said second semi-cylindrical shell are made of a rigid material selected from the group consisting of metal or fiber-reinforced plastic.

4. The system of claim 3, wherein said outer layer with said second tread surface is made of an elastomer.

5. The system of claim 1, wherein said first semi-cylindrical shell and said second semi-cylindrical shell are made of a rigid material selected from the group consisting of metal or fiber-reinforced plastic.

6. The system of claim 1, wherein said plurality of lug adaptors comprise:
a plurality of lug bolts, each of said lug bolts having a first end with said first threaded joint which screws into said threaded joint on said wheel, and a second end with said female joint; and
wherein said securing means comprises a cap having (a) a male joint which releasably connects to said female joint, and (b) a head.

7. The system of claim 1, wherein said connector comprises:
securing means comprises a cap having a head and a male joint which releasably connects to said female joint; and
wherein said first planar end surface of said first semi-cylindrical shell has a plurality of holes therethrough, each of said holes being smaller than said body portion of said each lug adaptor and larger than said head portion.

8. A method for protecting a wheel on a vehicle, said wheel having a flat tire of diameter d attached thereto, said method comprising:
attaching a first semi-cylindrical shell having a first planar end surface to said wheel;
attaching a second planar end surface of a second semi-cylindrical shell to said first planar end surface of said first semi-cylindrical shell;
wherein said first semi-cylindrical shell and said second semi-cylindrical shell are secured together so as to form a cylindrical shell of diameter greater than d having a cylindrical wall which covers a tread surface of said flat tire; wherein: said step of attaching said first semi-cylindrical shell comprises: securing a plurality of lug adaptors to said wheel, each lug adaptor having a body portion with a first threaded joint which attaches to a threaded joint on said wheel, and a head portion having a second female joint; sliding a plurality of holes in said first planar end surface of said first semi-cylindrical shell over said head portions of said plurality of lug adaptors, each of said plurality of holes in said first planar end surface being larger than said head portions, but smaller than said body portions of said lug adaptors; and releasably attaching a plurality of caps, each cap having a male joint and a head, to said second female joints of plurality of lug adaptors; wherein said first planar end surface of said first semi-cylindrical shell is secured between said body portions of said plurality of lug adaptors and said heads on said plurality of caps.

9. The method of claim 8, wherein:
said first semi-cylindrical shell is attached to said wheel so as to cover a first portion of a tread surface of said flat tire; and
wherein said method further comprises a step of rotating said wheel;
wherein said first portion of said tread surface does not contact a ground surface prior to said rotation step, but does contact a ground surface through said first semi-cylindrical shell after said rotation step.

10. The method of claim 8, wherein said first semi-cylindrical shell has said first planar end surface and a first semi-cylindrical wall attached to said first planar end surface; and
wherein said second semi-cylindrical shell has a second semi-cylindrical wall;
said first and second semi-cylindrical walls each having an outer layer with a tread surface attached thereto.

11. The method of claim 8, wherein said first semi-cylindrical shell and said second semi-cylindrical shell are made of a rigid material selected from the group consisting of metal or fiber-reinforced plastic.

12. The system of claim 8, wherein said outer layer with a tread surface is made of an elastomer.

13. A wheel system for attachment to a vehicle wheel having a plurality of threaded joints and a flat tire attached thereto, said system comprising;
a first semi-cylindrical shell having a first planar end surface having a plurality of first holes, said first planar end surface being perpendicular to the wheel axis;
a plurality of lug adaptors passing through said plurality of first holes, said plurality of lug adaptors connecting said first planar end surface to said plurality of threaded joints on said wheel;
a second semi-cylindrical shell having a second planar end surface having a plurality of second holes aligned with said lug adaptors and said first holes, said second planar end surface being perpendicular to the wheel axis; and
a plurality of connectors passing through said plurality of second holes, said plurality of connectors securing said second planar end surface of said second semi-cylindrical shell to said plurality of lug adaptors so that at least a portion of said second planar end surface overlaps said first planar end surface;
wherein said first semi-cylindrical shell and said second semi-cylindrical shell are secured together so as to form a cylindrical shell having (1) a cylindrical wall which covers a first tread surface of said flat tire and (2) a planar end wall formed from said first planar end surface and said overlapping second planar end surface.

\* \* \* \* \*